United States Patent
Flores et al.

(10) Patent No.: US 7,188,016 B2
(45) Date of Patent: Mar. 6, 2007

(54) METHOD AND DEVICE FOR MODELLING A MECHATRONIC SYSTEM IN A MOTOR VEHICLE

(75) Inventors: Pio Torre Flores, Stuttgart (DE); Juergen Schirmer, Heidelberg (DE); Michael Walther, Moeglingen (DE); Holger Huelser, Stuttgart (DE); Torsten Bertram, Duesseldorf (DE); Marc Heckes, Duisburg (DE); Joerg Petersen, Gelsenkirchen (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 10/240,395

(22) PCT Filed: Feb. 16, 2001

(86) PCT No.: PCT/DE01/00587

§ 371 (c)(1),
(2), (4) Date: Nov. 1, 2002

(87) PCT Pub. No.: WO01/73279

PCT Pub. Date: Oct. 4, 2001

(65) Prior Publication Data

US 2004/0030461 A1 Feb. 12, 2004

(30) Foreign Application Priority Data

Mar. 28, 2000 (DE) ................. 100 15 114

(51) Int. Cl.
*G06F 7/00* (2006.01)
(52) U.S. Cl. ........................................ 701/59
(58) Field of Classification Search ............... 701/36, 701/48, 51, 53–59, 99, 102; 477/7, 15, 20, 477/110, 111
See application file for complete search history.

(56) References Cited

U.S. PATENT DOCUMENTS 6,259,984 B1 * 7/2001 Kanzaki et al. ................ 701/51
6,445,989 B2 * 9/2002 Nishimura et al. ........... 701/48
6,665,566 B1 * 12/2003 Shibata et al. ................. 700/7

OTHER PUBLICATIONS

Strunce, "An Object Oriented Dynamic Simulation Architecture for Rapid Spacecraft Prototyping", aerospace Conference Proceedings, 2000, IEEE, Mar. 18, 2000-Mar. 25, 2000.*
"Technology for a New Automotive Era", Read-Time Magazine, Jul.-Sep. 1999, pp. 22 to 23.
"Cartronic-An Open Architecture for Networking the Control Systems of an Automobile" by T. Bertram et al, 1998, SAE 98 200, pp. 1 to 9.
"Requirements Management for Automotive Systems Development" by B. Gebhard et al, Mar. 2000, SAE 2000-01-0716, pp. 1 to 5.
"UML+ROOM as a Standard ADL?" 1999, IEEE, pp. 43 to 53.
Geretschläger, P. et al. "Objektorientierte Entwicklung eingebetteter Echtzeitsysteme im Automobil", Proceedings of the Workshop on Object-Oriented Modeling of Embedded Realtime Systems, May 28-29, 1999, pp. 1 to 6, Herrsching, Ammersee, Germany.

* cited by examiner

*Primary Examiner*—Thu V. Nguyen
(74) *Attorney, Agent, or Firm*—Walter Ottesen (57) ABSTRACT

A method and an arrangement are disclosed for modeling a mechatronic system in a motor vehicle in the context of an object-based ordering concept as a mapping in the unified modeling language. The elements of the CARTRONIC® with components and envelopes as their classes or objects and orders (with feedback), inquiries (with hint) and requests as their communication relationship are presented based on examples together with the essential rules from the overall control rules. A mapping requirement in the UML elements is shown for these modeling elements.

6 Claims, 8 Drawing Sheets

METHOD AND DEVICE FOR MODELLING A MECHATRONIC SYSTEM IN A MOTOR VEHICLE

RELATED APPLICATIONS

This application is the United States national stage of International application PCT/DE 01/00587, filed Feb. 16, 2001, designating the United States and claims priority from German patent application no. 100 15 114.0, filed Mar. 28, 2000, the entire content of which is incorporated herein by reference.

FIELD OF THE INVENTION

The invention relates to a method and an arrangement for modeling a mechatronic system in a motor vehicle.

BACKGROUND OF THE INVENTION

The requirement for more safety, efficiency, comfort as well as improved environmental compatibility permits the mechatronic in the motor vehicle to become an ever more significant and competition determining factor. Economical vehicle developments and the mastery of complex system structures in ever shorter production cycles compel universal computer-supported development processes which are automated as far as possible. In the analysis phase, modular expandable architectures for "function", "safety" and "electronics" can be specified on the basis of agreed to formal structuring rules and modeling rules of the ordering concept Cartronic, which is neutral with respect to automobile manufacturers and suppliers.

The demand for more safety, efficiency, comfort and improved environmental compatibility allows the mechatronic in the vehicle to become an ever more significant and competition determining factor in the conversion of technology from mechanics via electronics to information technology. In the continuously increasing complexity of the systems and production cycles which simultaneously become ever shorter, the cost and development complexity remains controllable only with the use of a universal computer-supported and substantially parallallelized work and development process, which is automated as far as possible.

A starting point for solving the partially diverging requirements is the networking of the individual systems, which up to now have worked substantially independently of each other, to a vehicle-wide integrated system and the logic combination of system components to functional units having standardized interfaces. The system network offers the possibility of a cooperation and multiple use of sensor means as well as actuator means and therefore a utilization of emerging functions.

The networking furthermore makes possible a conversion of pure function-oriented realizations to configurations wherein the application functions can be imaged to networked control apparatus. Furthermore, in partial system faults, dynamic shifting of functions to other systems can be supported.

Starting from logic function units having standardized interfaces, it likewise becomes possible to network functions of different origin and of various automobile manufacturers and suppliers to each other. A function supplier must then guarantee that the function maintains the required specification even for distribution to several network control apparatus.

Figure 1:
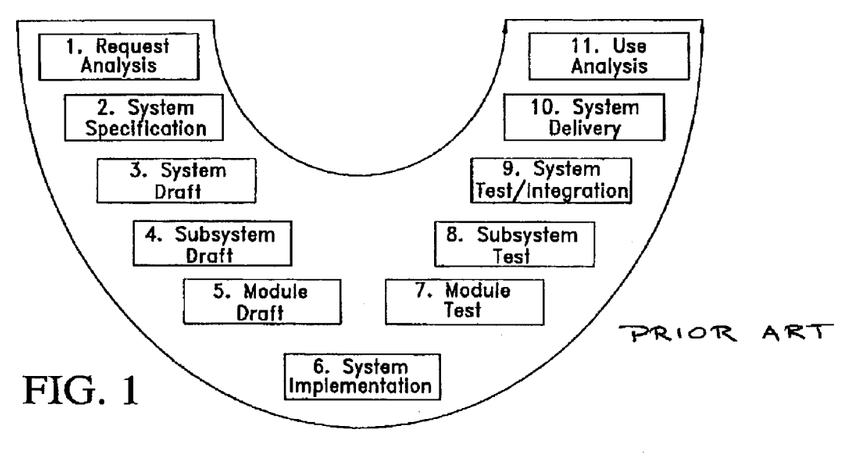
FIG. 1 shows a V-model which provides that all activities and sequences for function development can be arranged in eleven phases.

The development of complex networked systems has as a precondition a systematic process having recursive phases and the use of computer-supported tools. In this process, the automobile manufacturer as well as the supplier can formulate all the requirements and peripheral conditions for the function to be developed and analyze the many interactions with other functions and the ambient in all application situations and fault situations and can evaluate the function with respect to its effect on the entire network. For the development of complex networked systems, the V-model has become established as the model of approach also in the automobile industry. The V-model provides that all activities and sequences for function development can be arranged in eleven phases (FIG. 1).

The V-model describes a procedure wherein the specification and development processes are characterized by detailing and refinement and can be viewed as a top-down approach. In contrast, the verification and validation phases are bottom-up approaches. Essential requirements and preconditions for quality certification are detailed documentation papers for each individual phase.

The order concept "Cartronic" (see T. Bertram, R. Bitzer, R. Mayer and A. Volkart, 1998, Cartronic—An Open Architecture for Networking the Control Systems of an Automobile, Detroit/Mich., USA, SAE 98200, 1–9) was developed in order to satisfy the requirements for an economic vehicle development, the mastery of complex system structures and an adequate documentation.

In a first phase of the process chain, the analysis, the ordering concept, which is developed on the object-based basic idea, makes possible the logic combination of system components in functional units having standardized logic interfaces. The description of the networking of individual systems of a motor vehicle (which systems, up to now, work substantially independently of each other) therefore defines a (meta)-model for a modular expandable function architecture, safety architecture and electronic architecture. An essential advantage of this automobile-manufacturer neutral and supplier-neutral specification possibility is that, after a short work-in time, the logic description of the requirements is understandable to all participants in the development process already at a very early development time point.

As essential documentation elements, graphic-based models support, during all development phases, a communication between all persons, who participate in the development, as well as the maintenance and further development after completing the development. Supplementary to classical software engineering, the following groups of persons are to be supported for mechatronic system development in the motor vehicle industry: vehicle manufacturers as users/customers; as well as interested persons who require information as to the functions of the system; engineers in the area of mechanical engineering and electrical engineering; as well as computer personnel as developers of the mechatronic components on the manufacturer and supplier end; as well as those persons who modify or expand these components after a completed development and who therefore require understanding of the entire system or its parts; managers on the developmental and customer end who need organizational and economic details for project control, computation of costs and information as to future projects and developments; and, the vehicle drivers as special end users who must be made familiar with selected functions of the system.

An essential step at the end of the analysis phase and at the beginning of the design phase is the mapping of specification models, developed in Cartronic, into an informationtechnical draft for the software development. This mapping contributes to the increase of the information density and the expansion of the semantic content of built-up Cartronic models; defines component systems in a total system architecture; increases the transparency of the total system with the target direction of the implementation thereof; and, provides essential bases for a distributed development and testability of mechatronic systems.

In the following, a mapping of specification models, developed in CARTRONIC®, into a standardized object-oriented illustration is described with the background of a support as wide as possible via commercially available software development tools. A suitable notation or symbol which is required therefor is the object-oriented language standard of the unified modeling language (UML). The language standard is internationally standardized by the object management group (OMG).

In the following, a summarizing description of the structural elements and formal structuring rules as well as modeling rules in accordance with CARTRONIC® is given for function architectures. Furthermore, a function architecture of the entire vehicle with a detailing for the component "drive" is presented on a high abstraction plane. Proceeding from this, the description of theoretical bases of modeling first follows before the applied elements of the object-oriented notation with UML is discussed in the further course of this section. The procedure for the available model in accordance with Cartronic® is shown with respect to an example.

An example of a system network, which exists already in present day vehicles, is the drive slip control. This is only made possible by the communication of the control apparatus for the drive slip control with the control apparatus for the motor management for the control of the drive torque.

CARTRONIC® is an ordering concept for all control systems (open loop and/or closed loop) of a vehicle. The concept includes modular expandable architectures for "function", "safety" and "electronics" on the basis of agreed to formal structuring rules and modeling rules.

Architecture is here understood to mean the structuring system (rules) as well as their conversion into a specific structure. The function architecture includes all control (open-loop and/or closed loop) tasks which occur in the vehicle. The tasks of the system network are assigned to logic components and the interfaces of the components and their interaction are determined. The safety architecture expands the function architecture by elements which guarantee a reliable operation of the system network. Finally, a system is given for the electronics as to how the system network is to be realized with requirement optimized hardware topology.

The elements of the architecture are components and communications relationships, on the one hand, and structuring and modeling rules, on the other hand. In the context of structuring, a system is considered as a combination of components to form a whole which interact with each other via communication relationships. The term "component" does not perforce mean a physical unit in the sense of a part but is understood to be a function unit. In the ordering concept, three different types of components are distinguished:

components with mostly coordinating and distributing tasks;
components having primarily operative and executing tasks;
components which exclusively generate and make available information.

In the communication relationships, one distinguishes between a task (with feedback), an inquiry (with reference) and a request. The task is characterized by the duty of execution and, for the case where the task is not fulfilled, the task receiver has to provide a feedback to the task giver, which describes the reason for non-execution. The inquiry function serves to obtain information for the execution of a task. In the case that a component cannot make available the requested information, the component gives a hint to the inquiring component. A request describes a "wish" that a function is executed by another component. However, the duty of fulfilling is not coupled to the request, which is considered, for example, with competing requests. The following table summarizes the structural elements.

| STRUCTURAL ELEMENT | SHORT DESCRIPTION |
|---|---|
| Component | Logic function unit |
| Envelope | From a detailed component, there remains an envelope which transmits the communications to the subcomponents as well as expresses an "is part of" relationship (viewed from the outside to the inside) |
| System | A system comprises several components and (sub) systems (viewed from the inside to the outside) |
| Order (with feedback) | Order to act with duty to execute a function |
| Inquiry (with hint) | Determination of an information |
| Request | "Wish" for executing a function |
| Rules | Rules for: communication relationships modeling patterns |

The structuring rules describe permitted communication relationships within the architecture of the entire vehicle. One distinguishes structuring rules which control the communications relationships on the same abstraction plane and into higher and lower planes while considering indicated peripheral conditions. Further, the structuring rules clarify the transmission of communication relationships from one system into another system into its detailing.

The modeling rules contain patterns which combine components and communication relationships for the solution of special tasks which come up often. These patterns, for example, an energy management, can then be used again at different locations within the structure of the vehicle.

A structure, which is developed in accordance with the structuring and modeling rules, is characterized by the following features:

agreed to uniform structuring and modeling rules on all abstraction planes;
hierarchical task flows;
high self responsibility of individual components;
operator-controlled elements, sensors and estimators are equal information generators; and,
casing, which makes each component as visible for the remaining components as necessary and as invisible as possible.

Figure 2:
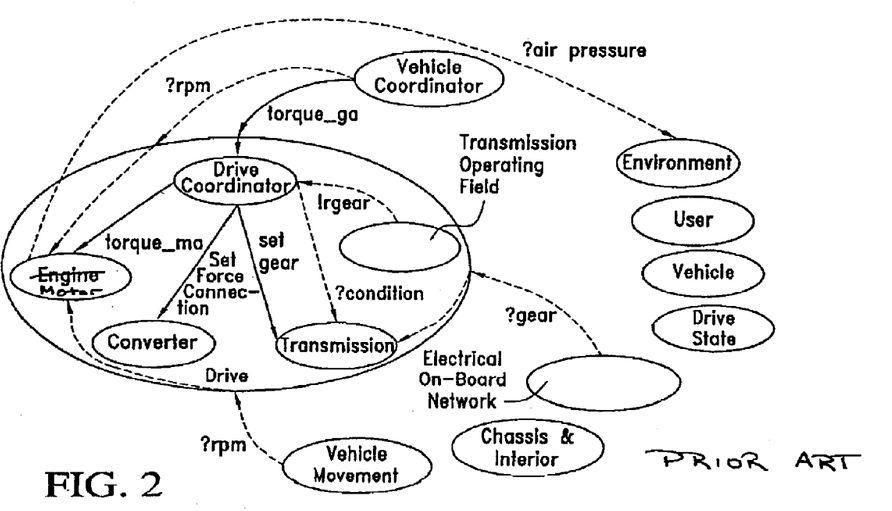
FIG. 2 shows, by way of example, the architectural features and the permitted communications relationships.

FIG. 2 presents, by way of example, the architectural features and the permitted communications relationships. These are (for simplicity's sake, only the following are referred to: order, inquiry and request, however, what is meant is the relationship which each of these makes possible):

the order torque_ga (make torque available at transmission output) which is transmitted by the envelope "drive" to the input component "drive coordinator" which, at the same time, is also "coordinator";

the orders: torque_ga (make torque available at motor output), establish force connection and set gear (set one of the gears) from drive coordinator to motor, converter and transmission;

the request !rGear (reverse gear) from the transmission operating field to the drive coordinator;

the inquiries ?state and ?airpressure (of the ambient) to transmission and ambient; as well as the inquiries ?gear (reverse gear or not) and ?rpm to the envelope "drive", which the envelope transmits further to the appropriate components "motor" and "transmission".

Figure 3:
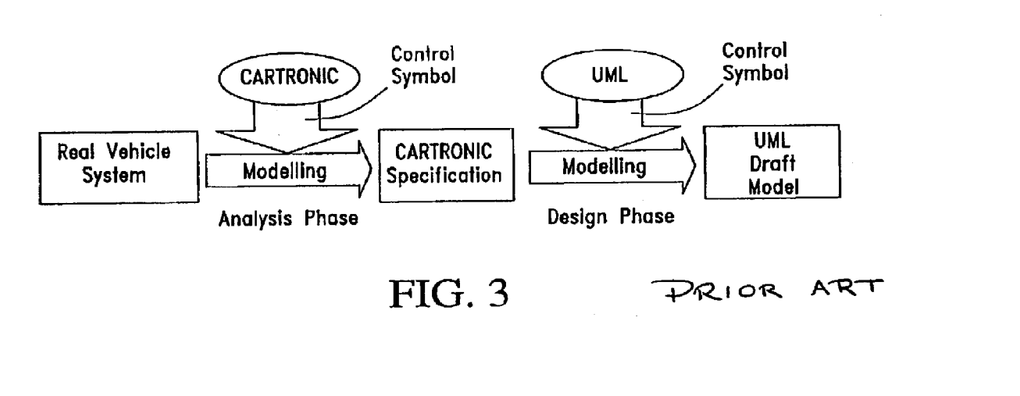
FIG. 3 is a block diagram of a CARTRONIC® model indicating the analysis phase and the design phase.

In the classical software life cycle, the following phases, which have to be run through rigidly sequentially, are distinguished: problem analysis, systems specification, draft, implementation with component test, total test and introduction as well as operation and maintenance of a software system. In practice, such a rigid sequential development process is an idealization which cannot be maintained. Theoretically clearly defined points overlap or are, under circumstances, advanced to different extents, at the same time, the know-how moves on simultaneously on behalf of all participants in the development process with the system development. An object-oriented procedure makes possible a phase overlapping procedure with, ab initio, high reusability of already developed or available components and concepts. This is significantly facilitated with the use of a computer-supported graphic symbol. The various method procedures, which are used in the object-oriented software development, contain a graphic symbol developed specifically for the particular method. The UML proceeded from the three methods mostly used in the industrial software development: the Booch method named for Grady Booch; the object modeling technique (OMT) developed under James Rumbaugh; and, the object-oriented software engineering (OOSE) developed under Ivar Jacobson. The UML defines no further new universal methods, rather, a meta model for the construction of models for different views (FIG. 3). It defines a graphic and supplementing tabular and textual notation or symbol having uniform syntax and clearly defined semantics.

Developed UML models are clearly interpretable by all persons participating in the development process and often have the following significant advantages:

the use of an international standard;

a tool supported procedure which is as independent as possible from the manufacturer;

a softening of the rigid maintenance of the classical sequential sequences of analysis phase and design phase in the software development without abandoning the software life cycle model as a basis of an engineer-like top-down procedure;

as far as possible, independence from the used program language on the logic plane;

the maintenance of the consistency between analysis, design draft and implementation; and, the possibility of a simultaneous bottom-up reverse-engineering procedure.

In the analysis phase, CARTRONIC® models arise as a predetermined structured specification of what the mechatronic system is intended to do. These models define an object-based abstraction of the functional logical concepts from the vehicle system structures. With a suitable mapping into a substantially more powerful UML model, the change from the analysis phase into the design phase and the developmental phase takes place. Here, the foundations for the total architecture of the software system are laid and component systems for the reduction or mastery of the complexity are defined and clean interfaces between these are specified. The addition of more and more details leads, in the advancing development process, in the direction of implementation. The target of the design or development phase lies in the: fixing of the system components, the assembly of these components and interfaces with the definition of the logic data model, which form the basis, including the data and algorithmic structures as well as the validation thereof. Complexity is to be mastered via abstraction. The simplicity as well as the ability to have an overview of the entirety must be guaranteed (structuring in the larger sense). In later steps, the structuring refers likewise to the selection of appropriate program components in the algorithmic formulation with the objective of optimizing the required power characteristics of the system (structuring in the smaller sense). The object of the implementation phase lies in the conversion of the logic data model, the system architecture and algorithms into a translatable program code for the individual control apparatus and the communications network in the motor vehicle.

BRIEF DESCRIPTION OF THE DRAWINGS

The invention will now be described with reference to the drawings wherein.

DESCRIPTION OF THE PREFERRED EMBODIMENTS OF THE INVENTION

In the following, the mapping of the Cartronic elements into UML elements is presented based on the detail shown in FIG. 4. Essential considerations are here: to support the CARTRONIC® rules as complete as possible; to maintain the basic ideas of the object orientation; and, to remain sufficiently understandable for the CARTRONIC® modeler and remain sufficiently transparent as well as being able to incorporate and illustrate all necessary information for later work steps.

Figure 4:
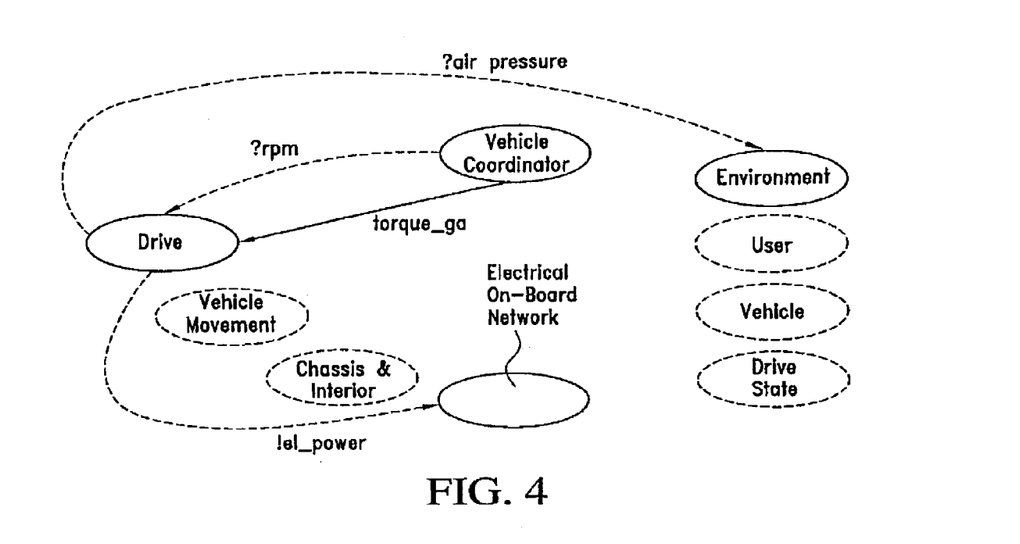
FIG. 4 shows CARTRONIC® components "environment", "drive", "vehicle coordinator" and "electrical on-board network"

FIG. 4 shows the CARTRONIC® components "environment", "drive", "vehicle coordinator" and "electrical on-board network". Between these components, the following communication relationships are present: the vehicle coordinator inquires of the drive as to the current ?rpm or orders the drive to make available a torque_ga at the transmission output. The transmission asks the information generator "environment" for the current ?airpressure and requests !el_power from the component "electrical on-board network".

Classes in the object-oriented terminology are, as a rule, the generalizations of like objects (masks) and, at higher abstraction planes, components or classes are more seldom material subject matter, rather, mostly abstract formations or function units. Objects (in general, items) are exemplary of classes having characteristics and behavior. In the object-oriented modeling, an often used start in the search for classes is the search for substantives because they, in general, form the generalization of object groups in the language. Adjectives describe characteristics and are, as a rule, modeled as attributes. Operations, in turn, define the performance of objects and therefore correspond to the verbs. It is therefore evident to illustrate the CARTRONIC® components as UML classes or UML objects.

The component classes are assigned to the above introduced categories via the stereotypes <<envelope>>, <<information generator>>, <<coordinator>>, <<operator>>. The component "environment" from FIG. 4 is, for example, shown as a class having the name "environment" and the stereotype <<information transducer>>.

Figure 5:
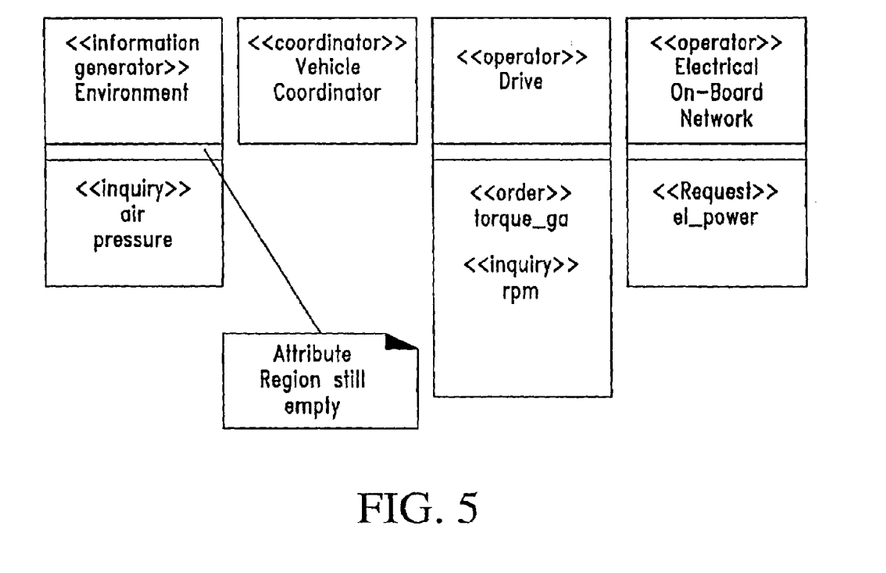
FIG. 5 shows that the double line in the classes "drive", "electrical on-board network" and "environment" has, up to now, there are still no attributes present.

The three CARTRONIC® communication types "order", "inquiry" and "request" require other components "to do something" (in object-oriented modeling, these are therefore interpreted as messages and modeled with the stereotypes <<order>>, <<inquiry>> and <<request>> as UML operations. The CARTRONIC® order "torque_ga" becomes the UML operation <<order>> torque-ga of the class "drive" and the CARTRONIC® inquiry "?rpm" to this component becomes the UML operation <<inquiry>> rpm and the CARTRONIC® inquiry ?airpressure to the component "environment" becomes the UML operation <<inquiry>> air pressure of the class "environment". In the illustration of FIG. 5, the double line in the classes "drive", "electrical on-board network" and "environment" illustrates that, up to now, there are still no attributes present. For the class "vehicle coordinator", the illustration of possibly available attributes or operations is completely omitted and only the declaration region of the class is shown. This provides a clearer diagram. CARTRONIC® responses can be modeled as feedback parameters of UML operations and are therefore not explicitly modeled as self-contained UML operations in the mapping requirement.

Figure 6:
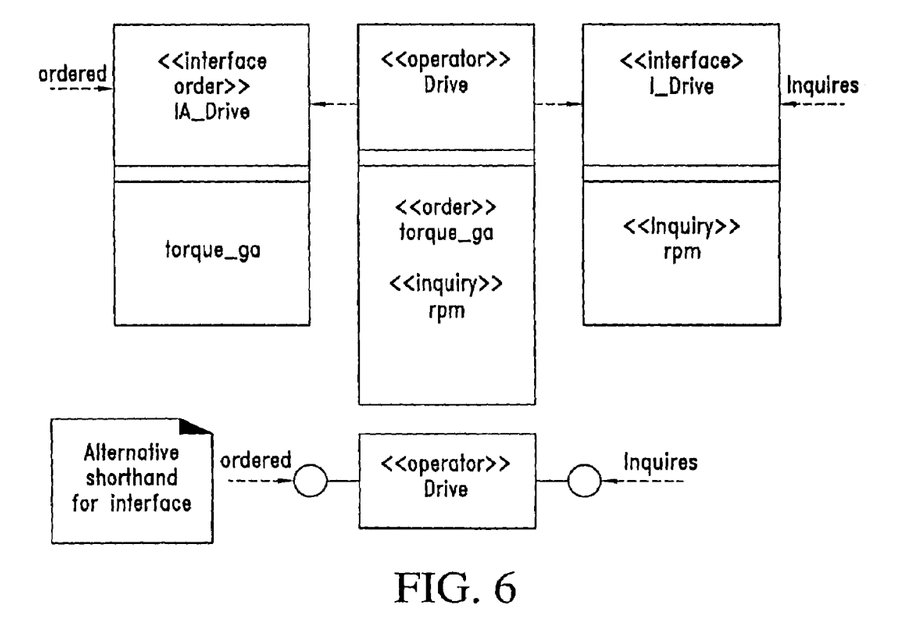
FIG. 6 shows the stricter access rules, which apply for orders in accordance with the "one-boss-principle" in the context of the class <<operator>> drive.

The capsulation of the individual components with the purpose of a defined access control (open loop and/or closed loop) is modeled for the UML operations via explicit UML interfaces. One distinguishes between interfaces for orders as well as inquiries and requests with the two stereotypes <<interfaceorder>> and <<interface>>. The stricter access rules, which apply for orders in accordance with the "one-boss-principle", are explicitly modeled hereby. FIG. 6 shows this by way of example of the class <<operator>> drive.

Figure 7:
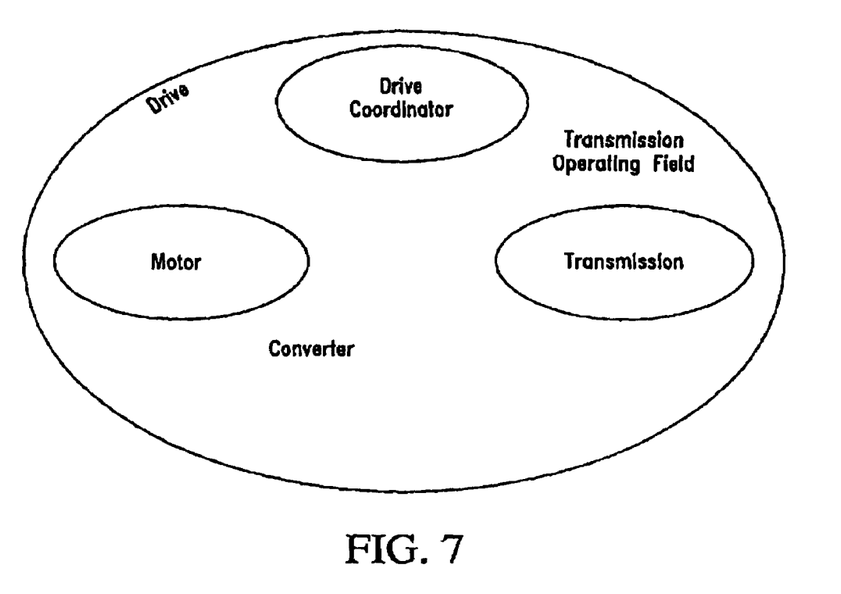
FIG. 7 shows a more detailed CARTRONIC® component with respect to the example of the component "drive"
Figure 8:
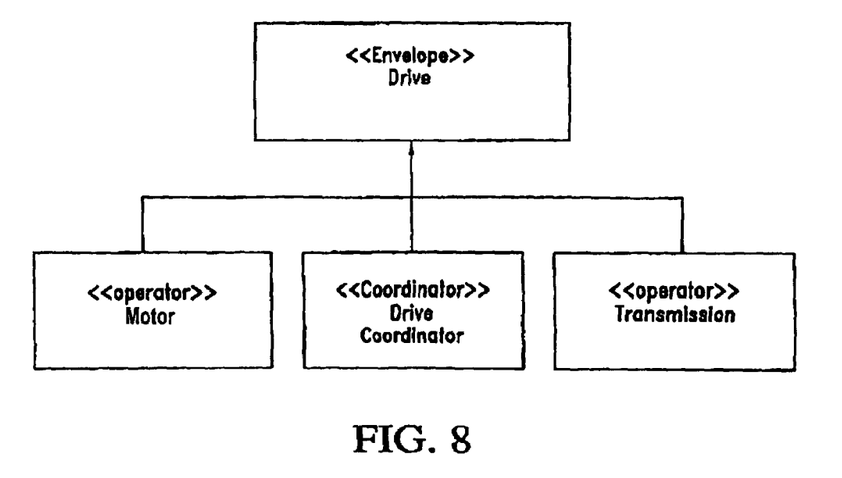
FIG. 8 shows the partially detailed UML class <<envelope "drive" as UML composition of the UML class "motor", "drive coordinator" and "transmission"

A more detailed CARTRONIC® component is shown by FIG. 7 with respect to the example of the component "drive", here, in contrast to FIG. 2, however, only with the three subcomponents "motor", "drive coordinator" and "transmission". UML aggregations express a "is part of" relationship and thereby correspond exactly to a CARTRONIC® detailing. UML compositions express, as special cases of UML aggregations analog to CARTRONIC® understanding, that subcomponents do not last without the aggregate. UML aggregate and UML composition as logic entirety delegate (automatically) messages which they receive but cannot themselves execute to the corresponding subcomponent (analogous to CARTRONIC® envelope characteristic). FIG. 8 shows the partially detailed UML class <<envelope>> "drive" as UML composition of the UML class "motor", "drive coordinator" and "transmission".

Figure 9:
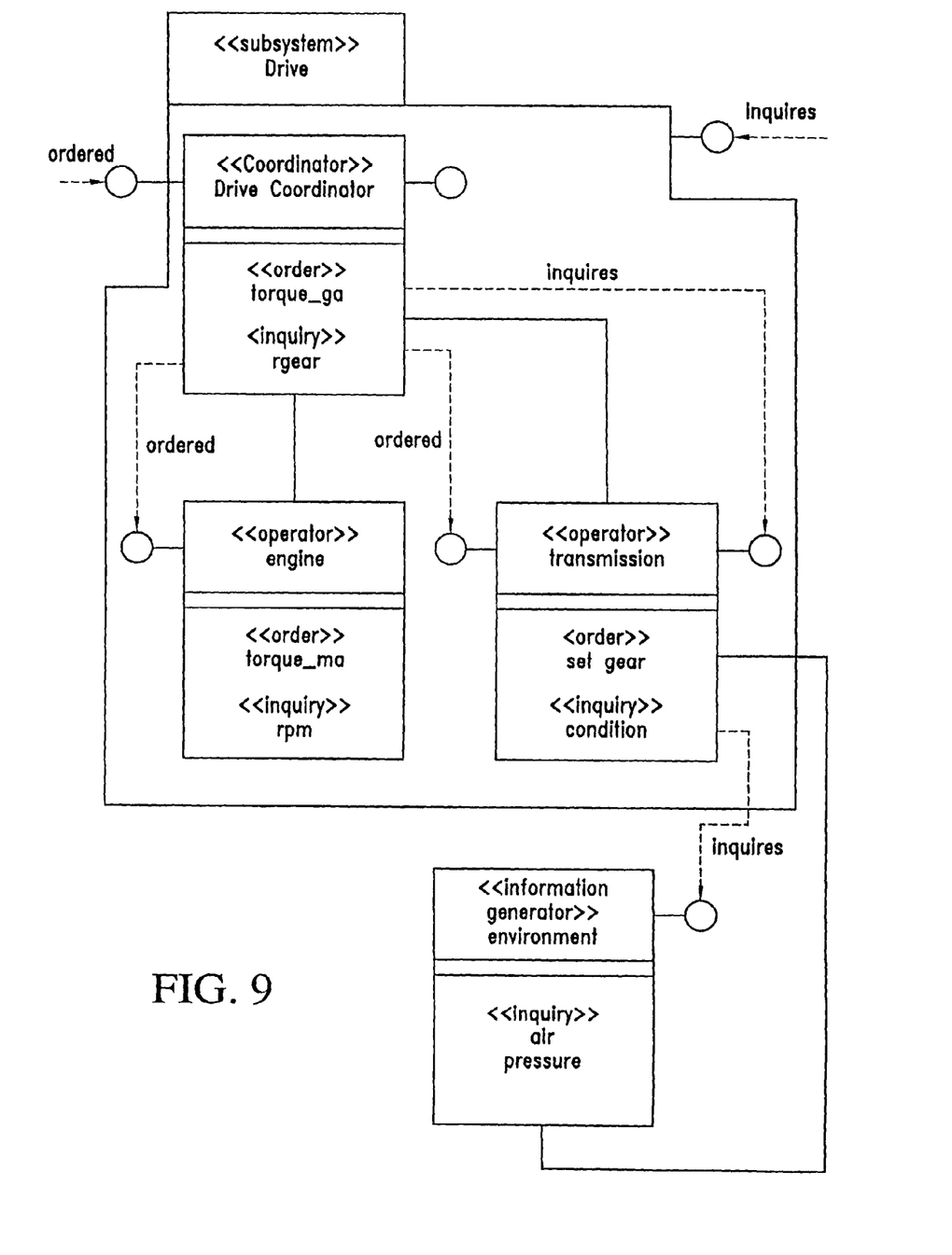
FIG. 9 shows that an interface (here <<interfaceorder>> "IA_drive") can be made available directly via the interface of an internal element (here <<interfaceorder>> "IA_drive coordinator")

Large complex CARTRONIC® components on a high abstract level can be mapped analog to the modeling via UML classes as well as UML subsystems. UML subsystems are a special form of UML packets, which are permitted to have interfaces and are therefore suitable to ensure a purposeful capsulation and structure mapping in a coarse manner. The separate interfaces for orders or inquiries and requests likewise are retained in the same manner as the procedure steps set forth in the following. Connections in the form of an aggregation or composition between the subsystem and model elements contained therein make possible the transmission of messages from the subsystem interfaces directly to the corresponding components. As shown in FIG. 9, an interface (here <<interfaceorder>> "IA_drive") can be made available directly via the interface of an internal element (here <<interfaceorder>> "IA_drive coordinator").

The continuous further development of the CARTRONIC® models requires change and exchange possibilities of components. In addition to the mapping of individual CARTRONIC® elements into the UML described above, the steps and operations in the advancing development process must be continuously supported. In practice, mixed forms of the following different procedural steps occur which are made up from the detailing, the abstraction, the substitution as well as the erasing of elements.

Figure 10:
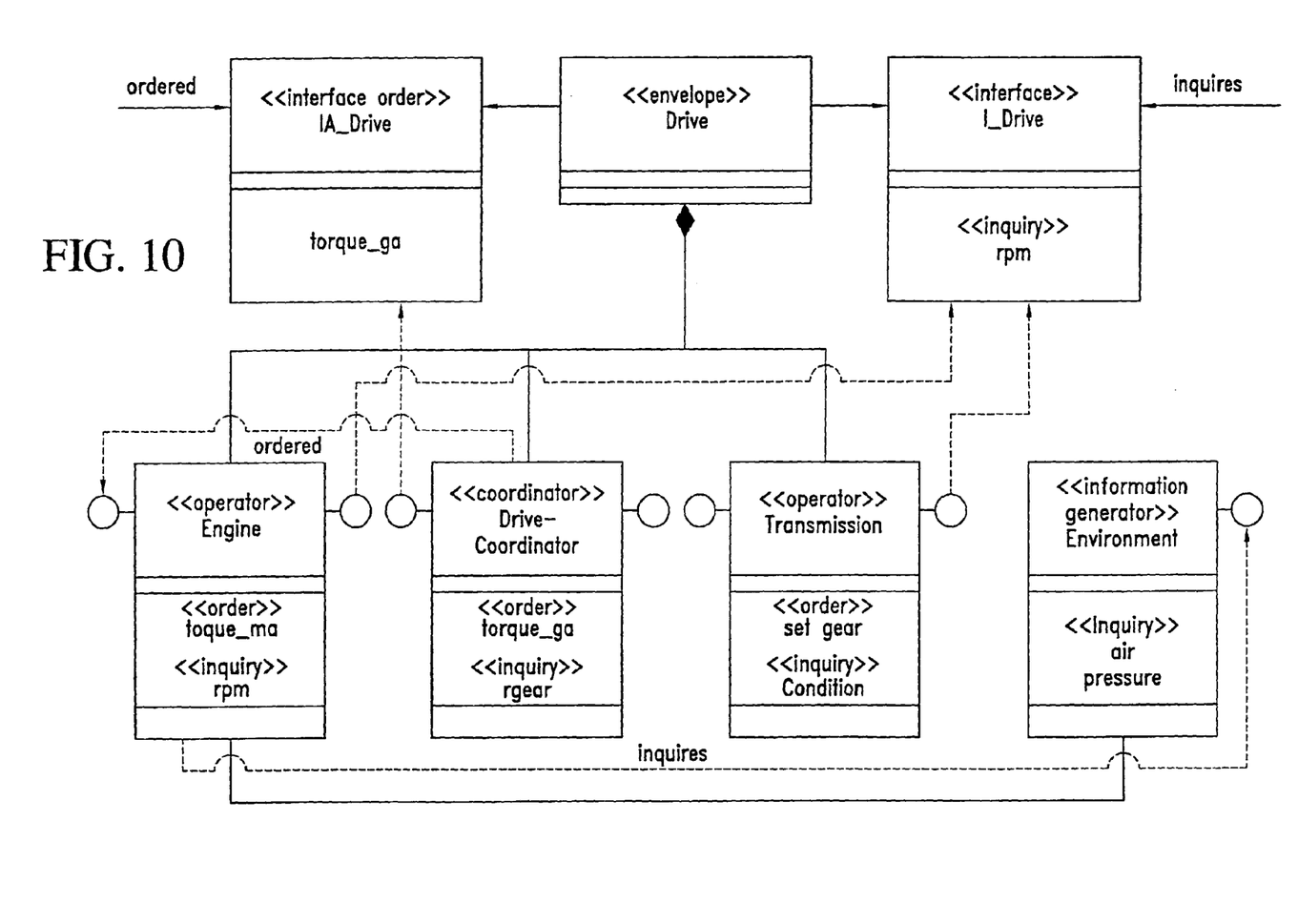
FIG. 10 shows the new UML class after detailing.

In the detailing of a CARTRONIC® component, an envelope without its own logic functions arises in accordance with the CARTRONIC® control rules and all already known existing functions are distributed to the arising subcomponents. The capsulation or the interfaces of the component to be detailed must be maintained completely in the envelope in order that the performance to the outside does not change. In the example of FIG. 6, these are the operations torque_ga and rpm of the class "drive". FIG. 10 shows the new UML class after the detailing. Detailing here is into the classes "motor", "drive coordinator" and "transmission" as well as additional operations <<order>> torque_ma, <<request>> rGear and <<order>> setgear.

What is to be noted is the illustration of the class "drive" with the now empty operation region as well as the change of the stereotype into <<envelope>>. The <<order>> airpressure of the component "motor" from the component "drive" to the <<information generator>> "environment" is modeled via a relationship to mean these two components in the form of an association (both must know each other) as well as a dependency of "motor" on the corresponding interface of "environment". This applies in the same manner for all CARTRONIC® communication relationships. The explicit modeling of all relationships of the UML classes amongst each other leads automatically to a complete overview of all accesses to each individual interface.

Figure 11:
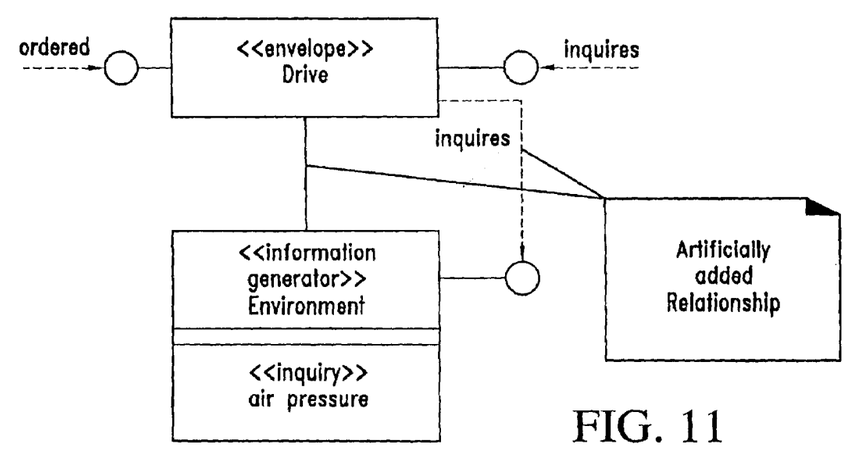
FIG. 11 shows an "empty" class which remains in the abstraction of detailed UML-aggregate "drive" in FIG. 10.

Abstraction operations are necessary and purposeful for a compact and clear illustration of structured complex component structures via their envelope components and interfaces. In the operation of the abstraction, no information is permitted to be lost from the detailed illustration and dependencies between the different components have to be mapped without adding additional information. In the abstraction of detailed UML-aggregate "drive" in FIG. 10, there remains, in contrast to the component "drive" shown in FIG. 6, an "empty" class (FIG. 11). Here results, however, the problem of the non-visibility of the relationship between a subcomponent from "drive" and "environment". For this reason, the UML model requires, in addition to the CARTRONIC® function architecture, an artificially set association and dependency between the components "drive" and "environment". With the use of a modeling tool, this problematic can be considered, for example, via corresponding ancillary attributes.

Figure 12:
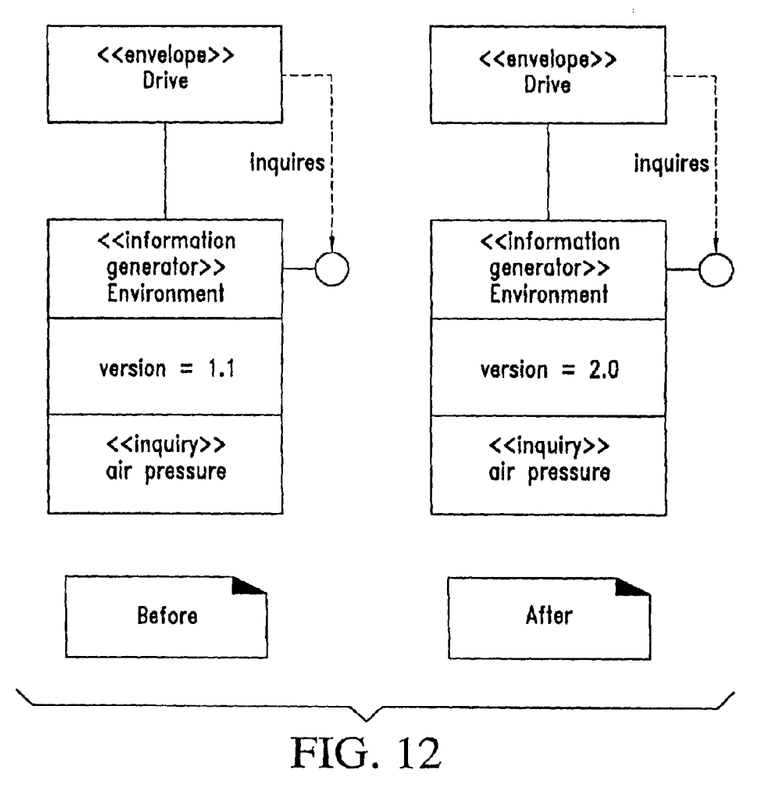
FIG. 12 shows the simplest type of exchange of elements is an exchange having the same functions wherein modifications are undertaken only internally in a component without a change of names, interfaces or relationships which is visible to the outside.

The simplest type of exchange of elements is an exchange having the same functions wherein modifications are undertaken only internally in a component without a change of names, interfaces or relationships which is visible to the outside (FIG. 12).

Figure 13:
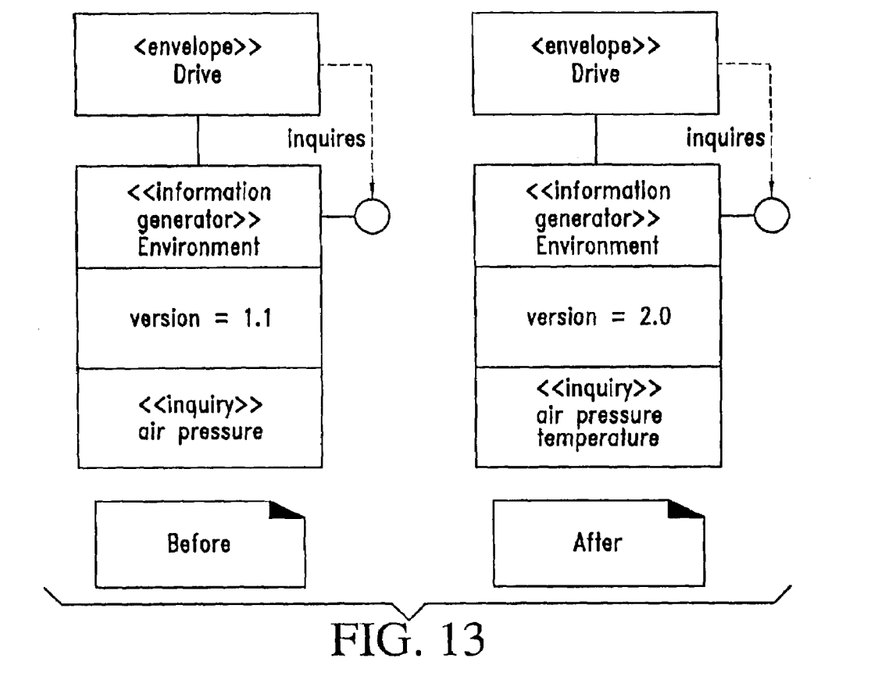
FIG. 13 shows an exchange with expanded functions is present when a component retains the name, existing relationships and its old functions but is expanded by new functions and therefore new interface operations; and, FIG. 14 shows that the component name and the interface remain unchanged if, with an exchange, inner elements of a component are so modified that new relationships to other components are required, then this is an exchange with changed relationships.

An exchange with expanded functions is present when a component retains the name, existing relationships and its old functions but is expanded by new functions and therefore new interface operations (FIG. 13).

Figure 14:
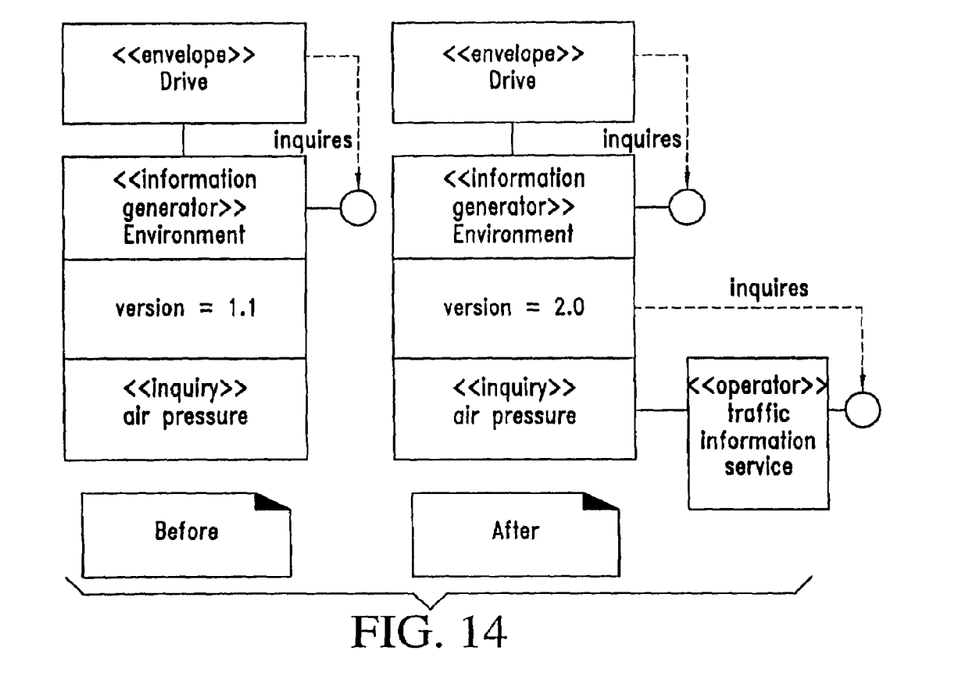

If, with an exchange, inner elements of a component are so modified that new relationships to other components are required, then this is an exchange with changed relationships. This is, for example, the case for additionally inquired information. The component name and the interface then remain unchanged (FIG. 14).

When exchanging with a drop of functions, individual functions or operations drop out in the interfaces. Before the actual erase operation, an (automatic) consistency check must take place to ensure that no further component of the entire model still uses the elements to be erased.

The erasure of a component can be viewed as a special form of exchange with dropping functions. Here, an available class is transferred into an "empty" class via iterative dropping of its operations.

A method and an arrangement for modeling a mechatronic system in a motor vehicle is described in the context of an object-based ordering concept as a mapping into the unified modeling language. This defines an essential connecting element between the analysis phase and the design phase or development phase in the object-oriented software development process. The elements of the CARTRONIC® having components and envelopes as their classes or objects and orders (with feedback), inquiries (with hint) and requests as their communication relationships are presented with the aid of examples together with the essential rules from the overall control rules. For these modeling elements, a mapping rule into the UML structures is illustrated. CARTRONIC® components including envelopes are mapped as UML classes or objects with the stereotypes <<coordinator>>, <<operator>>, <<information generator>> and <<envelope>>. The CARTRONIC® communications relationships "inquiry" and "request" are made available as UML operations having the stereotypes <<inquiry>> and <<request>> in interfaces having the stereotype <<interface>>. All order operations are characterized by the stereotype <<order>> in interfaces having stereotype <<interface order>>. Messages, which go into a detailed component, are automatically delegated to respective responsible subcomponents via composition relationships. For non-hierarchical communication relationships between order giver and order receiver, an association between these is modeled and a dependency relationship is modeled from the order giver to the interface location of the order receiver. The capsulation of components is therefore ensured via the two separate interfaces, the composition as implicit association relationship and the illustration of the dependencies. For the operations, which occur in the development process (detailing, abstraction, exchange and erasure of components), procedures are shown for the use of a commercially available UML software development tool.

The invention claimed is:

1. A method for modeling a mechatronic system in a motor vehicle, the method comprising the steps of:
   organizing said mechatronic system into a plurality of components between which pregiven communication relationships exist including inquiry, request and order;
   providing a mapping requirement with which said components and communication relationships are converted into elements of an object-oriented modeling language;
   dividing said components into an envelope and at least one subcomponent, wherein said subcomponent comprises existing functions of the component and said envelope comprises at least one interface for said communication relationships but without inherent logic functions and said envelope is devised as a UML-stereotype; and,
   configuring said mapping requirement so as to cause said components including component envelopes to be fixed as UML-classes and/or UML-objects and so as to cause said communication relationships inquiry, request and order to be fixed as UML operations and so as to cause said interfaces for said communication relationships to be fixed as UML-stereotypes.

2. The method of claim 1, wherein said object-oriented modeling language is a UML-language.

3. The method of claim 1, wherein said mapping requirement includes mapping said components including envelopes as UML-classes or objects having the stereotypes <<coordinator>>, <<operator>>, <<information generator>> and <<envelope>> and, wherein the method includes the further steps of:
   making available communication relationships inquiry and request as UML operations with the stereotypes <<inquiry>> and <<request>> at interfaces with the stereotype <<interface>>; and,
   characterizing all order operations by the stereotype <<order>> at interfaces having stereotype <<interface order>>.

4. An arrangement for modeling a mechatronic system in a motor vehicle, the arrangement comprising:

said mechatronic system including a plurality of components between which pregiven communication relationships exist including inquiry, request and order;

a mapping requirement with which said components and communication relationships are converted into elements of an object-oriented software language;

a division of said components into an envelope and at least one subcomponent, wherein said subcomponent comprises existing functions of the component and said envelope comprises at least one interface for said communication relationships but without inherent logic functions and said envelope is devised as a UML-stereotype; and, said mapping requirement being configured so as to cause said components including component envelopes to be fixed as UML-classes and/or UML-objects and so as to cause said communication relationships inquiry, request and order to be fixed as UML operations and so as to cause said interfaces for said communication relationships to be fixed as UML-stereotypes.

5. The arrangement of claim 4, wherein said object-oriented modeling language is a UML-language.

6. The arrangement of claim 4, wherein said mapping requirement includes mapping said components including envelopes as UML-classes and objects having the stereotypes <<coordinator>>, <<operator>>, <<information generator>> and <<envelope>> and, wherein:

communication relationships inquiry and request are made available as UML operations with the stereotypes <<inquiry>> and <<request>> at interfaces with the stereotype <<interface>>; and, all order operations are characterized by the stereotype <<order>> at interfaces having stereotype <<interface order>>.

* * * * *